(12) United States Patent
Ingenbleek et al.

(10) Patent No.: US 8,036,799 B2
(45) Date of Patent: Oct. 11, 2011

(54) METHOD AND DEVICE FOR CONTROLLING A FLUID-ACTUATED CONTROL SYSTEM

(75) Inventors: Robert Ingenbleek, Kressbronn (DE); Markus Ulbricht, Tettnang (DE); Mario Steinborn, Friedrichshafen (DE); Armin Brentel, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 547 days.

(21) Appl. No.: 12/226,076

(22) PCT Filed: Apr. 2, 2007

(86) PCT No.: PCT/EP2007/053136
§ 371 (c)(1),
(2), (4) Date: Oct. 7, 2008

(87) PCT Pub. No.: WO2007/115957
PCT Pub. Date: Oct. 18, 2007

(65) Prior Publication Data
US 2009/0132136 A1   May 21, 2009

(30) Foreign Application Priority Data

Apr. 7, 2006   (DE) .................. 10 2006 016 414

(51) Int. Cl.
*G06F 7/00* (2006.01)
(52) U.S. Cl. ...................................... 701/51
(58) Field of Classification Search ............. 701/51, 701/64, 66–67, 103; 74/335, 336 R, 473.11, 74/730.1
See application file for complete search history.

(56) References Cited

U.S. PATENT DOCUMENTS

| | | | |
|---|---|---|---|
| 4,595,979 A | 6/1986 | Arai et al. | |
| 6,223,118 B1 | 4/2001 | Kobayashi et al. | |
| 2002/0108830 A1 * | 8/2002 | Ochi et al. | 192/3.63 |

FOREIGN PATENT DOCUMENTS

| | | |
|---|---|---|
| DE | 33 12 526 A1 | 10/1983 |
| DE | 32 40 857 A1 | 5/1984 |
| DE | 195 48 161 C1 | 2/1997 |
| DE | 199 22 242 A1 | 12/1999 |
| DE | 100 46 106 C1 | 4/2002 |
| EP | 0 887 220 A1 | 12/1998 |
| EP | 1 055 847 A2 | 11/2000 |
| EP | 1 232 901 A2 | 8/2002 |
| EP | 1 344 965 A2 | 9/2003 |
| EP | 1 386 083 | 2/2004 |
| FR | 2 849 129 A1 | 6/2004 |
| WO | WO-02/086327 A1 | 10/2002 |

* cited by examiner

*Primary Examiner* — Kim T Nguyen
(74) *Attorney, Agent, or Firm* — Davis & Bujold, P.L.L.C.

(57) ABSTRACT

A method and device for controlling a fluid-actuated control system, to optimize post-switching times for actuation of control elements in such systems. The system includes at least one pressure medium source, at least one hydraulically controlled control element and a device for controlling the fluid-actuated control system. The optimum post-switching time after hydraulic actuation of the control element, depends on a number of different factors such as a control-element-specific parameter, a specific mounting location of the control element, at least one operating parameter of the fluid-actuated control system and/or of the vehicle. A post-switching time control device controls and/or regulates at least the duration of a post-switching time of the at least one control element and with the above factors determines the post-switching time.

17 Claims, 1 Drawing Sheet

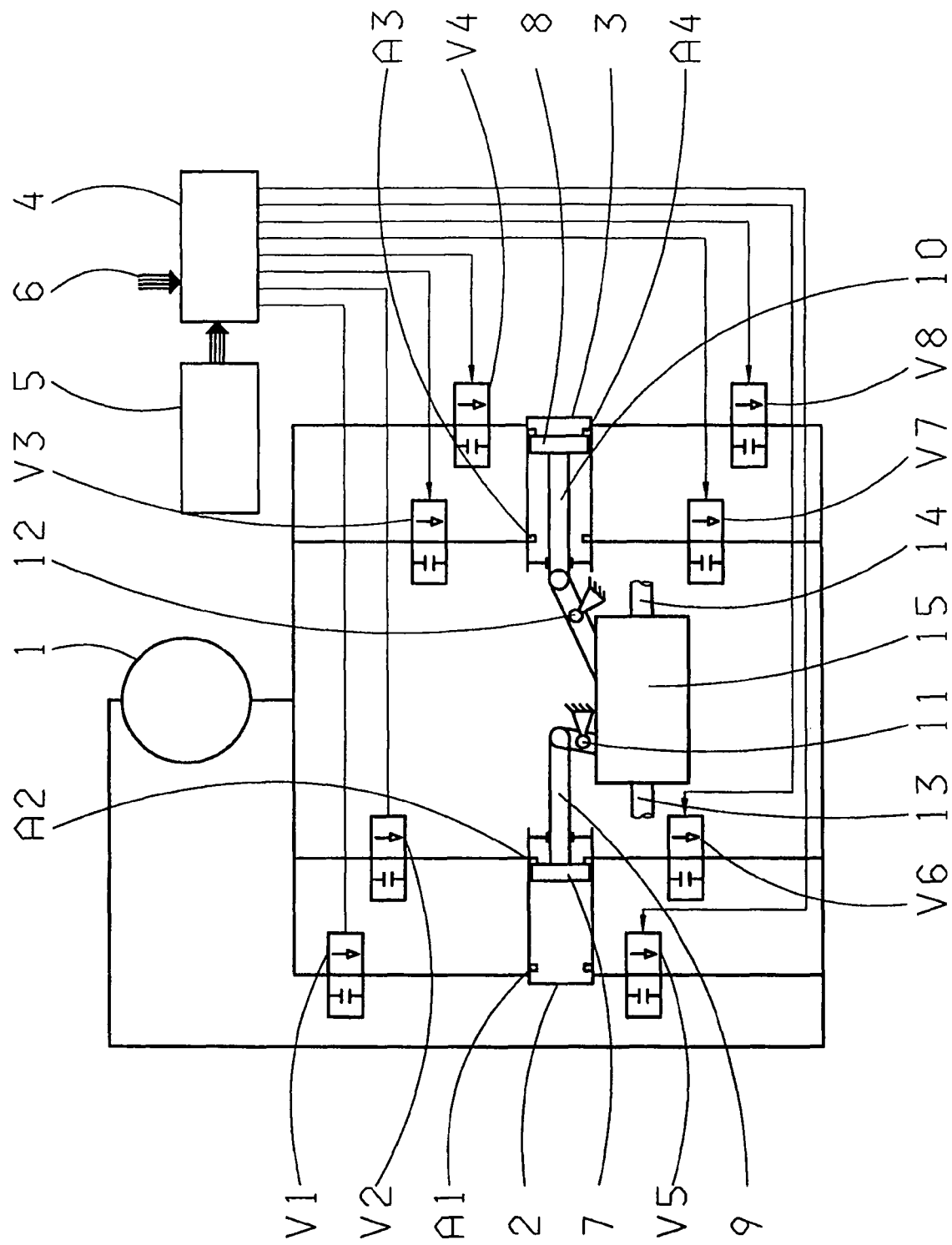

METHOD AND DEVICE FOR CONTROLLING A FLUID-ACTUATED CONTROL SYSTEM

This application is a national stage completion of PCT/EP2007/053136 filed Apr. 2, 2007, which claims priority from German Application Serial No. 10 2006 016414.8 filed Apr. 7, 2006.

FIELD OF THE INVENTION

The invention concerns a method for controlling a fluid-actuated control system and a device for implementing the method.

BACKGROUND OF THE INVENTION

Nowadays severe demands are made on fluid-actuated control systems, also referred to hereinafter as fluid medium systems, and especially on control systems of such type for automatic or automated transmissions in motor vehicles. Besides special requirements in relation to low weight at the same time as high reliability, long life and low maintenance, particularly in the case of passenger cars, vibrations and noise caused by the device constituents of the fluid medium system must be avoided or at least damped as much as possible. In addition, there are special requirements with regard to the actuation speed of control elements to be actuated since a traction force interruption caused by a gear change should last for as short a time as possible. At the same time, the fluid medium system should be produced and assembled as inexpensively as possible.

Thus until now, it has been usual in fluid-actuated transmissions, following a control action, i.e., a change in the position of at least one fluid-actuated control element, to switch off the pressure on the pressurized control element(s) or at least reduce it to a lower pressure sufficient for maintaining the desired position of the pressurized elements. This enables the load on the pressure medium lines and other pressurized parts of the pressure medium system and control elements to be relieved and, therefore, makes it possible to reduce the loads on the fluid medium system as a whole and correspondingly to design it weaker and lighter and/or increase its service life. In addition, if the system is only acted upon by high pressure while shift actions are actually taking place then, on account of the leak flows that always exist, this has advantages in relation to the energy required in order to produce the pressure and in relation to fluid loss if there are leaks in the system components concerned.

In order to prevent or at least reduce the rebound of a pressurized movable component of a control element, for example off a fixed stop abutment, and bring the pressurized movable component reliably to rest in a desired nominal position, it is usual, when the component has reached the desired position, for example against a mechanical stop abutment, to continue still acting upon it with pressure for a short time; the so-termed post-shifting time.

In the case of a fluid medium system with a plurality of control elements, it was sometimes regarded as advantageous, when a shift process or some other desired movement of at least one pressure-medium-actuated control element had to be carried out, for example to use a main valve to impose upon the system as a whole a standardized pressure for a standardized time consisting of a movement time and a post-shifting time, whereby the control element(s) to be actuated or their moving parts are moved to the desired actuation position while the other control elements or their moving parts are maintained fixed in their position by the action of the pressure.

Often, however, the control elements are also connected, via control valves fitted near them, to a pressure medium line that is kept continuously under a standardized operating pressure during operation and to a pressure medium outflow line under a lower pressure or to an unpressurized line so that, for the actuation of a control element, for example by corresponding valve actuation, the control element is selectively pressurized with the operating pressure for a standardized time. In the case of pneumatic systems, the pressure medium outflow line can often be replaced by simple means for venting to the surroundings. In this case as well, it is usual and has until now often been regarded as advantageous to provide a predetermined post-switching time.

To fulfil its function, in both cases the post-switching time should be chosen such that it can perform its intended purpose of damping rebound off stop abutments and securing the desired position of the pressurized moving parts of the control elements, so far as possible for all the control elements in the system and under all operating conditions.

However, the control method with a fixed post-switching time described above suffers from the following disadvantages:

Since the post-switching times required for the optimum operation of or desired for different control elements and locations thereof are very different, compromises are often necessary so that the post-switching times for one or some control elements have to be shorter or longer than actually needed.

The result is either that system components for which a shorter post-switching time would suffice are pressurized for an unnecessarily long time or else that system components which need particularly long post-switching times, or for which these would be desirable, are pressurized too briefly or at any rate for times that are not optimum under all operating conditions or not completely sufficient.

A design of the pressure medium system to give optimum post-switching times as similar as possible would, in most cases, result in disproportionate expense and/or a neglect of more important design objectives, such as simple and assembly-friendly line positioning and the use of lines with cross-sections as uniform as possible.

However, even if such a design were to achieve at least approximately equal post-switching times without neglecting other design objectives, a uniform post-switching time could at best only be optimized for a standard operating situation or for an extreme operating situation. Here the problem arises that an extreme operating situation demands a considerably longer, or perhaps a considerably shorter post-switching time than a standard operating situation and, therefore, either the post-switching time is set unnecessarily long or undesirably short during most of the operating time, or in extreme operating conditions the post-switching time is too short or too long.

Furthermore, with a system of the type usual until now it is as difficult to take into account different optimum post-switching times for different actuation directions of a control element, as it is to allow for differences in the definition of an optimum post-switching time determined with reference to different parameters.

For example, a minimum post-switching time that is still sufficient for moving a control element accurately enough to a nominal position and securing it there may be optimum in the event of a pressure drop in the fluid medium system, or other difficulties related to the pressure medium supply, whereas in the case of comfort-optimized shifting behavior of the transmission controlled by the fluid medium system, as desired by the driver, relatively long post-switching times have to be set in order to damp possible continuing oscillation of the moving parts of a control element as effectively as possible and to minimize pressure waves in the system and vibration caused by them.

In contrast, if the driver wants the shifting behavior to be made as sporty as possible, it can also sometimes be advantageous to have a relatively short post-switching time, so as to be able to bring the system back as quickly as possible to a defined starting condition and enable a repeated gear change. The resulting, slightly louder shift noise or vibrations may even be regarded as desirable in some cases, since they serve as indications of uncompromising design for power or sporty behavior.

Against that background the purpose of the present invention is to propose a control method for a fluid medium system, for example for an automated or automatic motor vehicle transmission, which is exempt from the disadvantages outlined above or at least substantially reduces them. A further objective is to describe a control system for implementing such a method.

SUMMARY OF THE INVENTION

The invention is based on recognition of the fact that the duration of an optimum post-switching time after a control element has been actuated by a fluid depends on many different factors and, therefore, that no uniform post-switching time can be specified either for all the part-systems or components of the fluid medium system or for all operating conditions or other boundary conditions so that a post-switching time, that can be adapted with reference to the factors, is advantageous.

Accordingly, the starting point of the invention is a method for controlling a fluid-actuated control system with at least one pressure source or pressure medium source and at least one control element that can be acted upon by fluid under pressure, as well as a device for controlling the fluid-actuated control system.

In this context, a fluid-actuated control system is understood to mean a hydraulic or pneumatic system which, with the help of valves that can be actuated electrically by a control device, selectively actuates control elements such as piston-cylinder arrangements or brings their moving parts to a desired target or set position and can therefore control an automated shift transmission of a motor vehicle in relation to its transmission ratio.

To achieve the method-related objective, it is provided that a post-switching time control device controls and/or regulates at least the duration of a post-switching time of the at least one control element and, in order to determine the post-switching time, the post-switching time control device takes into account at least one control-element-specific parameter, a specific mounting position of the control element and/or at least one operating parameter of the fluid-actuated control system and/or of the vehicle.

By virtue of a post-switching time duration selectively adapted to the circumstances at the time for each individual control element, the mechanical loading of the control element(s) and other components of the fluid medium system, such as pumps, lines and valves, can be reduced and a reduction or avoidance of resonant oscillations can be achieved by taking appropriate parameters into account for the determination of post-switching times.

In a preferred embodiment of the invention, the fluid-actuated control system comprises a plurality of control elements that can be acted upon by pressurized fluid, and the post-switching time control device specifies the post-switching time duration separately for different control elements.

This enables the post-switching time duration of one, several or even all the control elements of the fluid medium system to be set or changed as a function of the parameters, and thus the post-switching times to be optimized selectively in relation to the aims pursued in each case. Furthermore and in particular, the number of valves to be actuated, all at the same time, is minimized in that way and, therefore, also the electric power consumption associated with their control.

In this, depending on the design concerned it can be provided that certain control elements whose target position does not change during a shift process in progress are not acted upon by pressure, and their post-switching time is correspondingly zero. Consequently the valves associated with those control elements do not need to be actuated, so they also consume no electrical energy.

In addition, by adapting the post-switching times of different control elements the energizing of different valves can be staggered in time and the necessary peak power demand in the on-board electric system of the vehicle reduced thereby.

If the post-switching time control unit takes a rebound time into account as a control-element-specific parameter for determining the post-switching time, i.e., the time that passes, after a moving part such as a control piston of a control element has reached a target position, until the moving part actually comes to rest, then the post-switching time can be kept short and it can be ensured that the control piston does not come to rest in an undesired position because it has rebounded or, if there is no stop abutment, even because it has moved too far.

Furthermore, vibrations associated with rebounding can be reduced or prevented, these in particular being prone to spread via the fluid over greater distances, and when several vibrations are superimposed or if a resonance frequency is struck, sometimes resulting in severe damage of the fluid medium system, malfunctions, or at least in noise that is perceived as unpleasant.

The rebound time itself can be estimated from various parameters, measured, calculated or read out from stored tables. In particular, the rebound time can differ as a function of the pressure of the pressure medium or a pressure difference in the control element and depending on the structure of the control element. It may also be expedient, here, to take into account the temperature of the pressure medium or the control element and the movement speed and direction of the moving part of the control element.

The method can be optimized still further, for the determination of the post-switching time, if the post-switching time control device takes into account a post-oscillation time that results from properties of the fluid line leading to the control element. For example line cross-sections, line lengths, line resistances and resonance frequencies of the fluid lines can be taken into account here, in order to allow for various fluid-line-related dead times or resonance frequencies of the fluid lines in the actuation of the control elements.

Another feature of the method provides that for determining the post-switching time, the post-switching time control device takes into account as an operating parameter of the fluid-actuated control system, a fluid pressure available for actuating the control elements, that is actually present or to be expected in the near future.

This makes it possible not only to improve the estimation of the rebound time as already mentioned earlier, but also above all to react to an available fluid pressure that has been reduced by auxiliary aggregates or by a defect in the pumping system, thereby improving the emergency operation properties and the system compatibility. Furthermore, when a shift sequence is to be prepared or in the case of other foreseeable or expected fluid system conditions with varying fluid pressure, it is expedient to take these into account already before the forecast pressure value has been reached and to carry out necessary shift processes with the least possible influence on the pressure level which, in most cases, means making the post-switching times shorter.

According to another variation, for determining the post-switching time, if the post-switching time control device takes into account as an operating parameter of the fluid-actuated control system an actually existing or very shortly expected fluid volume flow available for actuating the control element(s), similar positive effects can be achieved which, however, are aimed at optimizing the available volume flow.

It is also expedient for determining the post-switching time that if a post-switching time control device takes into account as an operating parameter of the fluid-actuated control system whether a control element has been brought to another control position or, if the post-switching time control device determines the post-switching time already before control elements are actuated, whether it should be brought to another control position.

Particularly in the case of pneumatic systems, this is an expedient means for reducing the necessary volume flow and for reducing the pressure drop in the fluid medium system and can, moreover, also substantially prolong the life of valves and control elements by less frequent actuation or by the avoidance of pressure pulses that are not strictly needed.

Furthermore to determine the post-switching time, the post-switching time control device can also take into account, as an operating parameter of the fluid-actuated control system, the displacement direction of the control element.

This is especially appropriate in the case of control elements with an asymmetrical structure in which the rebound time, when opposite stop abutments are reached, is markedly different. However, it may also be expedient to take different loads into account, as can occur in the case of control movements with and against gravity or the force of a spring. Finally, even with control elements having otherwise equal rebound times, it may be found appropriate to vary the post-switching time as a function of the control movement direction if the pressure medium delivery and outflow lines or the valves are different.

A further variation of the method provides that for determining the post-switching time, the post-switching time control device takes into account as an operating parameter of the fluid-actuated control system the type of the shift called for at the control element. There may be different shift demands, particularly when engaging a system as opposed to disengaging it, but also during emergency operation as opposed to normal operation or in a sportiness-optimized shift mode compared with a comfort-optimized shift mode. With the help of the method, the post-switching times can be optimized for the particular requirements of the shift demanded in each case.

Similar positive effects, however, can also be achieved by appropriately taking into account the shift phase of the fluid-actuated control system, where the shift phase can be understood to mean a partial shift operation of a multi-stage shift process. Thus, it may be expedient to use different values for engaging a target gear of a transmission than for disengaging a previously engaged gear.

It any event, however, it is expedient for determining the post-switching time, if the post-switching time control device takes into account as an operating parameter of the fluid-actuated control system, the time point when a target position of the control element is reached, when this is known from sensors present in any case or can be determined without too much effort and expense.

Of course, it is possible in principle and also practicable to establish the post-switching time with reference to a control element movement time that can be expected, under the given operating conditions of the system, since this movement time, added to the post-switching time and any dead times involved, forms a total actuation time for valves that are to be actuated. However, the accuracy of the post-switching time increases considerably if fluctuations of the movement time, actually needed by the control element, have no effect on the post-switching time.

The reaching of a target position by a control element can be taken into account particularly simply if, for determining the post-switching time, the post-switching time control device takes into account as an operating parameter of the fluid-actuated control system a position signal of the control element which, in the simplest case, corresponds to an end position of the control element.

Such a position signal is all the more useful in that it allows a check of the position actually adopted by the control element and, therefore, enables a warning to be issued or other measures to be initiated in the event of a fault while, if temperature- or age-related position changes occur under otherwise equal boundary conditions, these effects too can be taken into account with little additional effort. Not least, a control element position signal enables a direct determination of mechanical oscillations so that the post-switching time can be set to values such that an unacceptable or undesired oscillation level is not exceeded.

A further fundamental aspect of the invention provides that, for determining the post-switching time, the post-switching time control device takes into account an operating condition for the vehicle as an operating parameter.

The term operating condition of the vehicle as a demarcation of operating conditions of the fluid-actuated control system is used in a very wide sense and also includes, for example, conditions of the vehicle's surroundings or of the driver which have a direct influence on the desired behavior of the vehicle and the fluid-actuated control system.

For example, the road condition comes into consideration as an operating condition of the vehicle since, if the road is smooth, it may be appropriate to make the post-switching times longer in order to produce, on the whole, more quiet driving behaviour when gear shifts are carried out.

Besides or in addition, a driver can specify the operating condition of the vehicle manually in that he sets a "sporty shifts" operating condition or a "comfortable driving" operating condition, by way of a selector switch or even by way of a variable coding of his ignition key.

In the first case, the post-switching times can be made considerably shorter compared with a normal driving model, which although sometimes giving rise to a slightly higher system noise emission caused by stronger vibrations, also enables a gear to be engaged more swiftly. In contrast, in the second case, the post-switching time can be optimized in relation to noise emission and vibrations, but thereby a somewhat slower shift time is deliberately accepted.

A final feature of the method provides that a control device of the vehicle automatically determines the operating condition of the vehicle on the basis of driving data related to the past, and so adapts the behavior of the fluid medium system or transmission shifts automatically to the driving style of the user, if necessary separately for different users who can be distinguished by way of respective key codes. For this purpose, actuation frequencies and movement amplitudes of the accelerator pedal, the brake pedal and the steering can be evaluated.

Below, a device will be described briefly which is suitable for implementing the method according to the invention.

A fluid-actuated control system for implementing the method, in accordance with at least one of the features described above, comprises at least one pressure medium source for acting upon a hydraulic or pneumatic working fluid with high pressure, at least one control element that can be actuated with the help of the pressurized working fluid and a control device for the actuation of valves to control and/or regulate the pressure in various parts of the fluid-actuated control system.

To that extent, up to this point, this fluid-actuated control system corresponds to a conventional hydraulic or pneumatic control system and in particular a hydraulic or pneumatic system for the automatic control of an automatic or automated transmission for a motor vehicle.

In addition, however, a post-switching time control device is provided, which can control and/or regulate at least one post-switching time of a control element as a function of at least one control-element-specific parameter and/or a mounting position of the control element and/or at least one operating parameter of the fluid-actuated control system and/or of the vehicle.

This post-switching time control device, of course, can be integrated in a conventional control device, but it can also be an independent module which appropriately adapts the signals from a conventional control device. The post-switching time control device has the usual and respectively necessary inputs and outputs, such as those for sensor or pickup signals, energy supply and output signals.

The latter can be emitted as parallel signals which, if necessary after electrical amplification, serve directly for the actuation of valves, but they can also be produced in the form of a bus signal in accordance with any desired protocol and, in a further module, can be linked, if necessary, with signals from a conventional control device and/or separated out into individual signals for different valves and amplified if need be.

In this, it does not matter whether the post-switching time control device reads in signals for the actuation of valves or control elements from a conventional control device and processes them further to take account of the desired or determined post-switching times, or whether the post-switching time control device transmits to a conventional control device correction signals to take account of the desired or determined post-switching times.

BRIEF DESCRIPTION OF THE DRAWING

The invention will now be described, by way of example, with reference to the accompanying drawings in which:

The sole FIGURE shows a fluid-actuated control system made in accordance with the invention.

DETAILED DESCRIPTION OF THE INVENTION

The drawing shows a fluid-actuated control system made in accordance with the invention, which consists of a pressure medium source 1, in this case, made as a hydraulic pressure medium pump, two control elements 2 and 3 in the form of piston-cylinder arrangements and respective valves V1 to V8 that control the pressure delivery and pressure outflow lines respectively to and from the pressure medium source, which are actuated by a post-switching time control device 4. However, the fluid-actuated control system can also be operated pneumatically.

From a conventional control device 5, the post-switching time control device 4 receives basic control data which take no account of post-switching times or only take them into account in a general manner as in the prior art and, in addition, comprises other inputs 6 for further signals. From these the post-switching time control device 4 forms total actuation times for the valves V1 to V8 which include the post-switching time that it determines.

In this example embodiment, the first control element 2 and the second control element 3 have, respectively, hydraulically displaceable pistons 7 and 8 which, in operation, are moved as far as one of stop abutments A1 or A2, or A3 or A4, respectively, and thereby, via piston rods 9 and 10 and thrust deflector devices 11 and 12 and the shifting and selector means associated therewith, set the transmission ratio between an input shaft 13 and an output shaft 14 of an automated shift transmission 15.

The essential feature of the invention is that the post-switching time control device 4 determines the post-switching time for the valves V1 to V8 in accordance with one or more of the embodiment variations, already described in detail above and, with the help of the control data communicated by the conventional control device 5 for the valves V1 to V8, forms total actuation times for the valves V1 to V8 and emits related control signals, if necessary, after appropriate amplification to the individual valves V1 to V8.

Of course, it is also possible that the conventional control device 5 sends actuation signals to the valves V1 to V8 and to form the total actuation times, receives from the post-switching time control device 4, the relevant post-switching times or correction values related thereto.

| Reference numerals | |
|---|---|
| 1 | pressure medium source |
| 2 | first control element |
| 3 | second control element |
| 4 | post-switching time control device |
| 5 | conventional control device |
| 6 | other signals |
| 7 | displaceable piston of the first control element |
| 8 | displaceable piston of the second control element |
| 9 | piston rod of the first control element |
| 10 | piston rod of the second control element |
| 11 | thrust deflector device of the piston rod of the first control element |
| 12 | thrust deflector device of the piston rod of the second control element |
| 13 | input shaft of the automated transmission |
| 14 | output shaft of the automated transmission |
| 15 | automated transmission |
| V1-V8 | valves |
| A1-A4 | stop abutments for the displaceable pistons of the control elements |

The invention claimed is:

1. A method for controlling a fluid-actuated control system in a vehicle with at least one pressure medium source (1) and at least one control element (2, 3) that are acted upon by pressurized fluid, and with a control device (5) for controlling the fluid-actuated control system, the method comprising the steps of:

controlling and regulating, via a post-switching time control device (4), at least a duration of a post-switching time of the at least one control element (2, 3); and considering at least one control-element-specific parameter, a specific mounting location of the control element (2, 3), at least one operating parameter of the fluid-actuated control system and at least one operating parameter of the vehicle when determining the post-switching time with the post-switching time control device.

2. The method according to claim 1, further comprising the step of providing the fluid-actuated control system with a plurality of control elements (2, 3) that are acted upon by pressurized fluid, and the post-switching time control device (4) specifying the duration of a post-switching time separately for the different control elements (2, 3).

3. The method according to claim 1, further comprising the step of considering a rebound time as another control-device-specific parameter for determining the post-switching time with the post-switching time control device (4).

4. The method according to claim 1, further comprising the step of considering an oscillation decay period that results from properties of a fluid line to the control element for determining the post-switching time with the post-switching time control device (4).

5. The method according to claim 1, further comprising the step of considering, as an operating parameter of the fluid-actuated control system, a fluid pressure available for actuating the at least one control element (2, 3) that one of actually exists or is expected in a near future, when determining the post-switching time with the post-switching time control device (4).

6. The method according to claim 1, further comprising the step of, when determining the post-switching time with the post-switching time control device (4), considering a fluid volume flow available for actuating the at least one control element (2, 3) that actually exists or is expected in a near future.

7. The method according to claim 1, further comprising the step of considering whether the at least one control element (2, 3) has been moved to another control position or should be so moved when determining the post-switching time with the post-switching time control device (4).

8. The method according to claim 1, further comprising the step of, when determining the post-switching time with the post-switching time control device (4), considering a displacement direction of the at least one control element (2, 3).

9. The method according to claim 1, further comprising the step of, when determining the post-switching time with the post-switching time control device (4), considering a type of shift demanded from the control element (2, 3).

10. The method according to claim 1, further comprising the step of, when determining the post-switching time with the post-switching time control device (4), considering a shift phase of the fluid-actuated control system.

11. The method according to claim 1, further comprising the step of, when determining the post-switching time with the post-switching time control device (4), considering a time at which a target position of the at least one control element (2, 3) has been reached.

12. The method according to claim 1, further comprising the step of, when determining the post-switching time with the post-switching time control device (4), considering a position signal of the at least one control element (2, 3).

13. The method according to claim 1, further comprising the step of, when determining the post-switching time with the post-switching time control device (4), considering an operating condition of the vehicle.

14. The method according to claim 13, further comprising the step of enabling a driver to manually indicate the operating condition of the vehicle.

15. The method according to claim 14, further comprising the step of automatically determining the operating condition of the vehicle with a vehicle control device based upon previous driving data.

16. A fluid-actuated control system for implementing a method of controlling and regulating at least a duration of a post-switching time of at least one control element (2, 3) with a post-switching time control device (4) and considering at least one control-element-specific parameter, a specific mounting location of the at least one control element (2, 3), at least one operating parameter of the fluid-actuated control system and at least one operating parameter of the vehicle when determining the post-switching time with the post-switching time control device, the control system comprising:

at least one pressure medium source (1) for pressurizing a working fluid;

the at least one control element (2, 3) that is actuated with help of the pressurized working fluid;

a control device (5) for actuating valves (V1, V2, V3, V4, V5, V6, V7, V8) for at least one of controlling and regulating the pressure in various parts of the fluid-actuated control system; and a post-switching time control device (4) for at least one of controlling and regulating at least the post-switching time of the at least one control element (2, 3) as a function of at least one control-element-specific parameter, a mounting location of the at least one control element (2, 3) and at least one operating parameter of the fluid-actuated control system and at least one operating parameter of the vehicle.

17. The control system according to claim 16, wherein the fluid-actuated control system is one of a hydraulic system and a pneumatic system.

\* \* \* \* \*